UNITED STATES PATENT OFFICE 2,634,253

SALICYLALDEHYDE POLYMERIC POLYPRIMARY POLYAMINE CONDENSATION PRODUCTS

John T. Maynard, Wilmington, Del., assignor to E. I. du Pont de Nemours and Company, Wilmington, Del., a corporation of Delaware No Drawing. Application July 26, 1951, Serial No. 238,788

3 Claims. (Cl. 260—47)

This invention relates to new synthetic resins and their preparation. More particularly this invention relates to new aminealdehyde resins and to methods for their preparation.

Research in the field of synthetic resins has produced a continuous flow of new products designed to fit specific uses. In the realm of nitrogen-containing resins the amide-aldehyde, especially the urea-aldehyde and melamine-aldehyde resins, have attained great commercial success and are the basis of important industries. In contrast, the aminonitrogen-aldehyde resins as a class have not attained commercial success and are of little or no technical importance. These aminonitrogen-aldehyde resins have been made from monomeric amines, especially from aromatic monoamines, such as aniline, and formaldehyde. These aminonitrogen-formaldehyde resins owe their lack of success to a combination of deficiencies, including high degree of color, relatively low molecular weight, and low degree of functionality.

It is an object of this invention to provide new synthetic resins, particularly new aminealdehyde resins and methods for their preparation. A further object is to provide a new class of aminonitrogen-aldehyde resins which embody properties missing from the hitherto known aminonitrogen-aldehyde resins. Other objects will appear hereinafter.

The objects of this invention are accomplished by providing the new class of aminonitrogen-aldehyde resins which are condensation products of salicylaldehyde with polymeric polyprimary polyamines in which the main polymer chain consists of carbon atoms and the aminonitrogens are lateral substituents to the main carbon chain. Thus this invention provides new aminonitrogen-aldehyde resins which are condensation products of salicylaldehyde with polymeric polyprimary polyamines in which the main polymer chain consists of carbon atoms and the aminonitrogens are attached directly thereto, as in the products obtained by the reductive amination of monoolefin/carbon monoxide copolymers as described in U. S. Patent 2,495,255 to Hoehn, issued January 24, 1950, or the aminonitrogens are attached to carbon atoms of the main carbon chain through extra-linear monovalent radicals which consist entirely of carbon atoms or which contain oxygen in addition to carbon.

The preferred resins of this invention are the condensation products of salicylaldehyde with those polymeric polyprimary amines in which the main polymer chain consists of carbon atoms and the aminonitrogens are lateral substituents with the nitrogen thereof directly attached to two hydrogen atoms and through not more than 7 chain atoms (i. e., directly or by a chain of 1 to 7 atoms) to a carbon atom of the main carbon chain.

In one method for preparing the resins of this invention a reactor is charged with a solution of the polymeric polyprimary polyamine in an organic solvent. To the solution there is added the salicylaldehyde and the mixture heated to between 30° and 100° C. with agitation until completion of the reaction. Two hours is usually sufficient. The water of reaction may be removed as an azeotrope with the organic solvent. Thereafter, the solvent may be removed by distillation under reduced pressure. If desired, however, this step may be omitted and the condensate used as a solution in the organic reaction medium.

The examples which follow are submitted to illustrate preferred embodiments and not to be construed as limitations of the invention. Parts are by weight unless otherwise stated.

Example I

A polyamine was prepared by reducing an ethylene/carbon monoxide copolymer in the presence of ammonia according to U. S. Patent 2,495,255. The polyamine contained 3.04% of total nitrogen, 2.09% of primary aminonitrogen, and had a neutral equivalent of 494. One-hundred parts of this polyamine was dissolved in 200 parts of benzene by heating to 80° C. with stirring. Fifteen parts of salicylaldehyde was added slowly while the reaction mixture was stirred at this temperature. Stirring was continued for 20 minutes, after which the reaction mixture was allowed to stand for 16 hours. It was filtered and the filtrate evaporated under vacuum. A nearly theoretical amount of a yellow, tacky solid remained. This product was soluble in benzene, xylene and chloroform, partly soluble in pyridine and acetic acid, and insoluble in dioxane, cellosolve, ethanol and methanol. This resinous material formed insoluble chelate salts with cupric, zinc, cobaltous, ferric, mercuric, stannous and stannic ions.

Example II

To 1460 parts of a 47% decalin solution of a 10:2:1.1 butadiene/methacrylonitrile/styrene copolymer there was added 265 parts of ethylene glycol and 1075 parts of decalin. The solution was placed in a pressure reactor and the polymer reductively aminated at 250° C. and 1500 lb./in.$^2$ pressure for 12 hours in the presence of 69 parts of liquid ammonia, 1159 parts nickel-on-charcoal and 18 parts of palladium-on-charcoal. The product obtained analyzed 9.96% total nitrogen, 2.4% aminonitrogen, neutral equivalent 372, and molecular weight 2250. Eight-hundred parts of a 23.3% aqueous acetic acid solution of this polyamine was precipitated with 90 parts of 10% sodium hydroxide solution with rapid stirring. The precipitated solid was washed with water and then dissolved in 600 parts of benzene. The remainder of the water was removed by refluxing using a device for water collection. The anhydrous solution of polyamine in benzene was treated with 32.2 parts of salicylaldehyde and held at 70° C. for one-half hour with stirring. The reaction mixture was refluxed and the theoretical amount of water for the condensation (5 parts) was removed. The resulting solution of the condensation product was filtered to clarify it and used as such. The yield was nearly theoretical. Evaporation of the solvent left a yellow, tacky solid with considerable tensile strength. This forms chelates with metals in the same manner as the product described in Example I.

*Example III*

The polyamine used in this experiment was prepared according to patent application of M. E. Cupery, S. N. 176,918, filed July 31, 1950, and now abandoned, of which S. N. 295,127, filed June 23, 1952, is a continuation-in-part, by treating an 82:18 vinyl acetate/allyl glycidyl ether copolymer having an equivalent weight of 650, a molecular weight of 2000 and an oxirane content of 2.46% with concentrated (25%) NH₃ at 65° C. for two hours. The polyamine had an equivalent weight of 790 and contained 1.7% nitrogen. 23.2 parts of the polyamine was dissolved in 100 parts of dioxane. To this solution there was added 4.65 parts of freshly distilled salicylaldehyde. The reaction mixture was heated at 50° C. for 45 minutes and then allowed to stand for two days. Evaporation in vacuo left 25.2 g. of a yellow resin, a nearly theoretical yield.

In the practice of this invention there may be used any polymeric polyamine in which the aminonitrogen is present predominantly as primary aminonitrogen and which has a molecular weight of at least 500. These polyprimary polyamines are of three general types:

The first type are the products obtained by the reductive amination of 2 to 4 carbon atom monoolefin/carbon monoxide copolymers, as described in U. S. Patent 2,495,255 to Hoehn, issued January 24, 1950. The preferred polymeric polyprimary amines are the reaction products of the reductive amination with hydrogen and ammonia of a polymer of a 2 to 4 carbon monoolefin, particularly ethylene, with carbon monoxide in which the mole ratio of monoolefin to carbon monoxide is preferably from 150:1 to 1:1 and these polymeric polyprimary amines are characterized by having a main carbon chain and aminonitrogens as lateral substituents with the nitrogen thereof directly attached to two hydrogen atoms and to a carbon atom which is an integral part of the main carbon chain. These polyprimary polyamines may also contain carbonyl carbon in the chain of carbon atoms comprising the main polymer chain. A typical polymeric polyamine of this type is the following.

A stainless steel-lined pressure reactor is charged with 40 parts of an ethylene/carbon monoxide copolymer having a molecular weight of 1480 and an ethylene/carbon monoxide ratio of 10.4:1, 400 parts of benzene, and 40 parts of nickel-on-kieselguhr catalyst. The vessel is closed, evacuated and charged with 100 parts of anhydrous ammonia. The reactor is placed on a shaker machine and connected to a source of high pressure hydrogen. Hydrogen under pressure is charged into the reactor and heating and agitation are started. The temperature is raised to 200° C. and the pressure is adjusted to 200 atmospheres. These conditions are maintained for 15 hours. The reactor is allowed to cool, excess hydrogen and ammonia are bled-off, and the mixture of solvent, polymeric polyamine and catalyst are discharged from the reactor. The reaction mixture is diluted with benzene and filtered to remove the catalyst. Analysis of the solution shows it to contain 25% solids by weight. The product has a neutral equivalent of 525 and contains 82.15% carbon, 12.92% hydrogen, 3.12% nitrogen (Dumas method) and 2.61% primary aminonitrogen (Van Slyke method).

The second type are those polyprimary polyamines which have a main carbon chain and primary amino groups attached thereto through a hydrocarbon radical of from 1 to 7 carbon atoms. Examples of such polymeric polyamines are the products obtained by reducing poly(3-pentenenitrile), the reduction product of poly(nitrostyrene), the reduction product of nitrated butadiene/styrene copolymers, the reductive amination products from vinyl ketone polymers and copolymers with vinylidene compounds, reduction products of polymers and copolymers of nitriles of the general formula

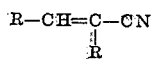

in which each R is a member of the class consisting of hydrogen, an alkyl group or an aryl group, with at least one other polymerizable compound containing a

group. Examples of such compounds are styrene, methyl styrene, 1,3-butadiene, isoprene, vinyl naphthalene, vinyl acetate, and the like, as disclosed in U. S. Patent 2,456,428.

The third type are the products disclosed and claimed in the copending application of M. E. Cupery, U. S. Serial No. 176,918, filed July 31, 1950 and now abandoned, of which S. N. 295,127, filed June 23, 1952, is a continuation-in-part. In these products the aminonitrogen atom is part of an extra-linear chain which contains oxygen in addition to carbon. Examples of such products are the reductive amination products of copolymers of vinyl acetate with allyl glycidyl ether or of vinyl acetate with glycidyl methacrylate, of vinyl chloride with allyl glycidyl ether, and the like.

In general it is desirable that the amount of salicylaldehyde used be at least one mole per amino group in the polymer. If desired, however, lesser amounts of the order of 0.25 mole per amino group in the polymer or larger amounts may be used.

As a rule, it is desirable to effect the condensation in solution in a common solvent for the aldehyde and polymeric polyamine. This, however, is not critical as the reaction may be effected in the absence of a solvent or in dispersion in a non-solvent for the aldehyde or polymeric polyprimary polyamine or in a non-solvent for both the polymeric polyprimary polyamine and aldehyde.

When the condensation reaction is conducted in solution it is desirable to use as concentrated solutions as possible to reduce solvent costs. Suitable solvents are aromatic hydrocarbons such as benzene, toluene, xylene, and the like.

The condensation reaction between the aldehyde and polymeric polyprimary polyamine may be effected at temperatures in the range of 30 to 100° C. Usually, however, good reaction rates are realized in the range of 40° to 90° C. and this embraces the preferred operating temperature conditions.

The time of reaction depends upon such interdependent variables as temperature, nature of poymeric polyprimary polyamine, efficiency of contact between reactants, and extent of condensation desired. Usually between 15 minutes and three hours will be adequate for the condensation.

Although it is not essential, if it is desired to isolate the condensation product this may be done by evaporation of the solvent either at ordinary or at reduced pressures or by drowning in a non-solvent for the condensation product. The resin formed may be dried at ordinary temperatures or by any other means known to those skilled in the art.

In place of salicylaldehyde there may be used any other o-hydroxyaromatic aldehyde, such as vanillin or 2-hydroxy-4-methyl benzaldehyde.

The condensation products of this invention are useful as metal chelating agents, as metal corrosion inhibitors, as stabilizers for hydrogen peroxide, and as stabilizers for chlorine-containing polymers. In a corrosion test, a coating 0.08 mil in thickness of the product of Example I prevented rusting for 30 days of autobody steel held at 100° F. and 100% relative humidity.

As many apparently widely different embodiments of this invention may be made without departing from the spirit and scope thereof, it is to be understood that this invention is not limited to the specific embodiments thereof except as defined in the appended claims.

I claim:
1. An aminonitrogen-aldehyde resin which is the condensation product of salicylaldehyde with a polymeric polyprimary polyamine having a molecular weight of at least 500 and in which the main polymer chain consists of carbon atoms and the amino-nitrogens are lateral substituents to the main carbon chain.

2. An aminonitrogen-aldehyde resin which is the condensation product of salicylaldehyde with a polymeric polyprimary amine which is the reaction product of the reductive-amination of a polymer of a monoolefin containing 2 to 4 carbon atoms with carbon monoxide, said polymeric polyprimary amine having a molecular weight of at least 500 and a main carbon chain and amino-nitrogens as lateral substituents with the nitrogen thereof directly attached to two hydrogen atoms and to a carbon atom which is an integral part of the main carbon chain.

3. An aminonitrogen-aldehyde resin which is the condensation product of salicylaldehyde with a polymeric polyprimary amine which is the reaction product of the reductive-amination of a polymer of ethylene with carbon monoxide, said polymeric polyprimary amine having a molecular weight of at least 500 and a main carbon chain and amino-nitrogens as lateral substituents with the nitrogen thereof directly attached to two hydrogen atoms and to a carbon atom which is an integral part of the main carbon chain.

JOHN T. MAYNARD.

REFERENCES CITED

The following references are of record in the file of this patent:

UNITED STATES PATENTS

| Number | Name | Date |
| --- | --- | --- |
| 2,181,121 | Downing | Nov. 28, 1939 |
| 2,526,637 | Cupery | Oct. 24, 1950 |
| 2,526,638 | Cupery | Oct. 24, 1950 |
| 2,526,639 | Cupery | Oct. 24, 1950 |